United States Patent [19]

Rysti et al.

[11] 4,290,722
[45] Sep. 22, 1981

[54] METHOD FOR USING TIMBER SORTING COMPARTMENTS AND A SORTING COMPARTMENT FOR SAID METHOD

[75] Inventors: Alpo Rysti, Friisilantie 36, 02240 Espoo 24, Finland; Seppo Anttila, Vantaa; Veijo Maki-Hoimela, Espoo, both of Finland

[73] Assignee: Alpo Rysti, Espoo, Finland

[21] Appl. No.: 64,116

[22] Filed: Aug. 6, 1979

[51] Int. Cl.$^3$ .............................................. B65G 65/00
[52] U.S. Cl. ........................................ 414/48; 414/98; 414/786; 209/933
[58] Field of Search ............... 209/517, 518, 519, 520, 209/521, 933; 414/48, 49, 98, 99, 100, 331, 786

[56] References Cited

U.S. PATENT DOCUMENTS

| | | | |
|---|---|---|---|
| 3,696,948 | 10/1972 | Murdoch et al. | 209/933 X |
| 3,700,120 | 10/1972 | Romick et al. | 209/933 X |
| 3,776,379 | 12/1973 | Harvey | 209/73 |
| 3,789,980 | 2/1974 | Nagy | 209/518 |
| 4,098,407 | 7/1978 | Moore | 209/517 |

FOREIGN PATENT DOCUMENTS

| | | |
|---|---|---|
| 44352 | 8/1967 | Finland . |
| 367931 | 6/1974 | Sweden . |
| 405815 | 3/1977 | Sweden . |

Primary Examiner—Trygve M. Blix
Assistant Examiner—L. E. Williams
Attorney, Agent, or Firm—Fitzpatrick, Cella, Harper & Scinto

[57] ABSTRACT

There is provided a method and apparatus whereby pieces of timber are sorted into lots on supporting arms which are suspended by flexible and extensible members. As the timber is added, the arms are lowered and finally extend down to a conveyor apparatus. The arms then open to discharge the timber on to the conveyor apparatus and are then drawn up, are closed and reach the start position where a new lot of timber is received.

9 Claims, 3 Drawing Figures

4,290,722

METHOD FOR USING TIMBER SORTING COMPARTMENTS AND A SORTING COMPARTMENT FOR SAID METHOD

BACKGROUND OF THE INVENTION

1. Field of the Invention

The present invention relates to sorting compartments and to a procedure for the use of such compartments for sorting timber. In this procedure, a sorting compartment is filled with timber pieces, after which it is opened and the timber lot that has accumulated into it is allowed to discharge on the take-up equipment, with which the timber lot is then removed to be further processed. After discharging, the compartment is closed for the reception of the next timber lot.

2. Description of the Prior Art

In timber sorting installations, various different compartment sections with compartments into which timber is directed according to its size and type are known. For instance, such installations are known wherein a compartment bottom comprises a trap door hinged at its one edge, while the other end of the compartment is suspended by flexible supporters for opening and closing the compartment by raising and lowering these flexible supporters. For this kind of compartment system, we refer to the applicant's Finnish Patent Publication No. 44352.

As it has been noticed that, due to the high dropping altitude, timber may break in sorting compartments described above, wherefor elevator- or lift-type compartments have been taken into use, as in these, the timber lot is cautiously lowered on the take-up level, which may for instance, be a carriage or a conveyor, with which the timber lot is then removed to be further processed. Such sorting compartment systems have recently been developed in which the compartments are bags composed of flexible supporters, said bags being expanded as timber accumulates into the bag. Examples of bag compartments of this type are described in the applicant's Finnish patent application No. 773917, SE Publication prints Nos. 367,931 and 405,815, and U.S. Pat. No. 3,776,379. However, in these well-known compartment constructions, there have been such drawbacks that they have not come into general use. As an example of these drawbacks, one can mention complicated and expensive structures, that also have an unfavorable effect on the reliability of operation. Another drawback is that as, in equipment known so far, the drive mechanisms of the flexible supporters wind up only one end of the supporter, and rewinding that must take place after the compartment has been emptied is too slow for modern highly efficient sorting equipment. As the flexible supporters are lengthened when filling up the compartment and as the compartment is opened only at its one edge, timber pieces at the edge areas of the bag come into a rotating movement that breaks sharp edges of timber pieces thus lowering their quality. Further, there is the additional drawback that special triggering mechanisms are required for opening and closing the flexible supporters.

SUMMARY OF THE INVENTION

We have conceived and contribute by the present invention compartments of the class described by which we are able to sort timber in a manner to avoid the drawbacks mentioned above and to provide a simple and economical method and compartment construction.

For attaining the objectives mentioned above and to be expressed later, the principal characteristic features of the invention are:

That the timber lot is formed on rigid supporting arms suspended by pairs of flexible suspending organs;

that by lengthening the hanging part of the suspending organ pairs, the supporting arms are lowered under the level of the take-up device;

that the locking of said supporting arms is opened or allowed to open;

that the supporting arms are lifted to the top position by shortening the hanging part of the suspending organ pairs;

that the supporting arms are locked to form a closed bottom of the compartment for receiving pieces of the next timber lot, for which the procedure phases defined above will be repeated.

The principal characteristic features of a timber sorting compartment in which the inventive procedure is allied are:

That to the lower end, at a suitable point, of said flexible supporters there are fastened rigid supporting arms with appropriate locking equipment;

that underneath the level of the take-up conveyor there are suitable organs for opening said locking equipment, and that in the top part of the compartment there are particular guiding organs for guiding the supporting arms so to lock them in the position where they form the closed bottom of the compartment when in the top position.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other methods and structures for carrying out the purposes of this invention. It is important, therefore, that this disclosure be regarded as including such equivalent constructions as do not depart from the spirit and scope of the invention.

BRIEF DESCRIPTION OF THE DRAWINGS

Several embodiments of the invention have been chosen for purposes of illustration and description, and are shown in the accompanying drawings forming a part of the specification, wherein.

DESCRIPTION OF THE PREFERRED EMBODIMENTS

Figure 1:
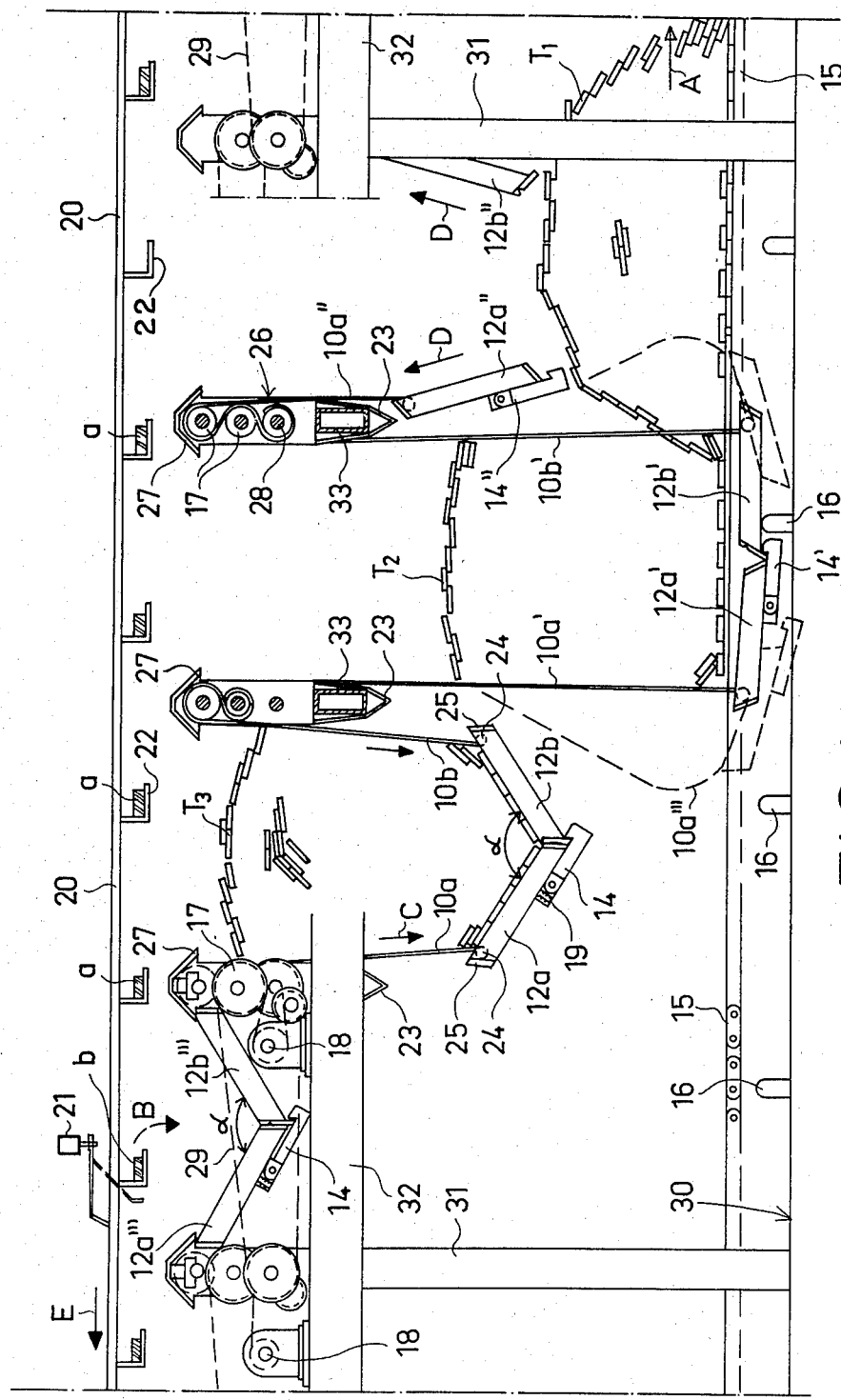
FIG. 1 shows the compartment section of a timber sorting installation, in which compartment section the inventive procedure is applied, with different compartments shown in different phases of operation.
Figure 2:
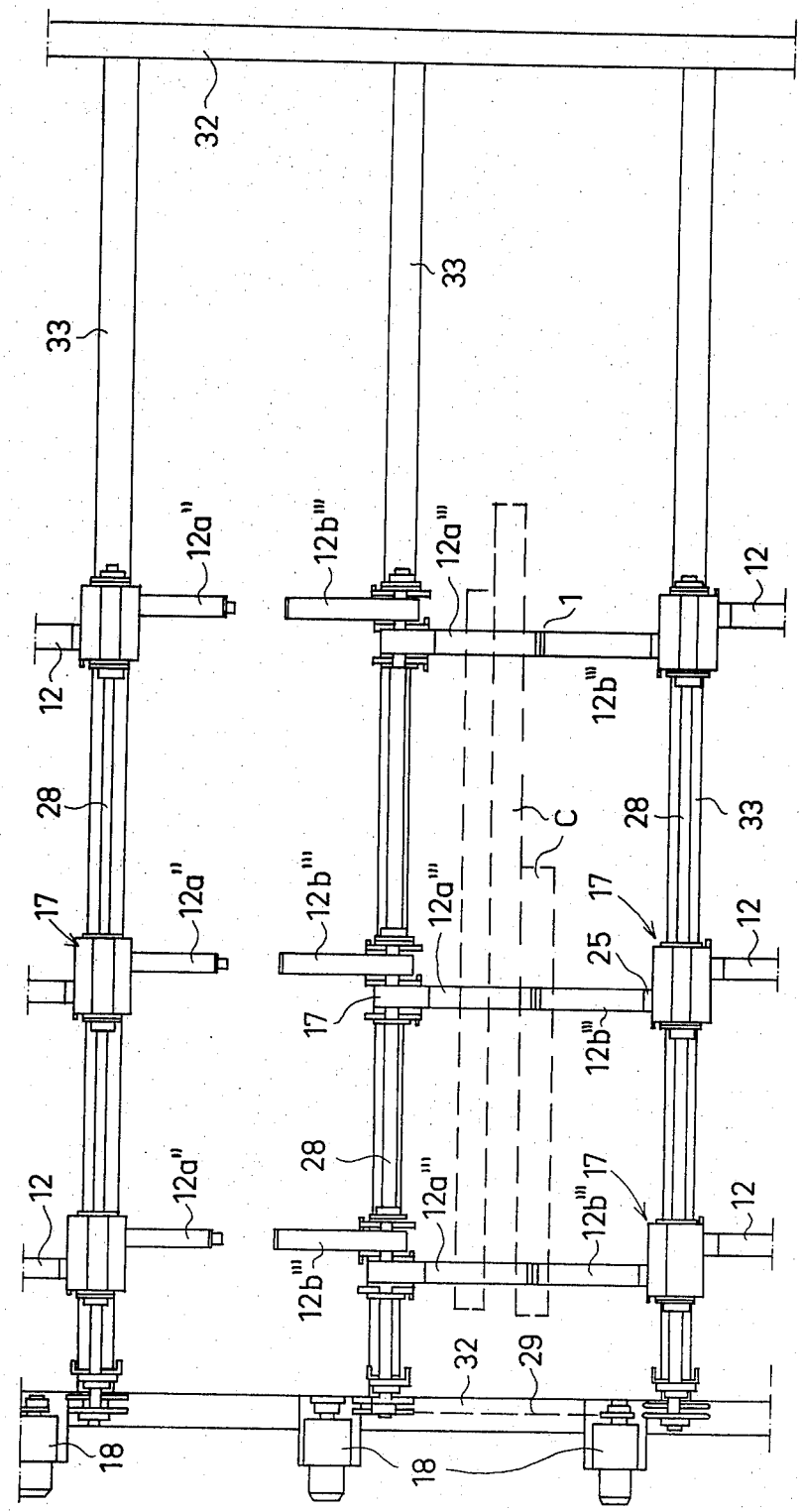
FIG. 2 is a plan view of a compartment section shown in FIG. 1.

As shown in FIGS. 1 and 2, timber pieces a, b are, with hooks 22 of top conveyor 20, brought to a sorting compartment assembly that comprises several successive sorting compartments, into which timber pieces fall from hooks 22 according to controlled impulses. The dropping is carried out with dropping equipment 21, known as such, with for instance, stopper arms that come to the front of timber piece b as conveyor 20 moves in the direction of arrow E, whereat timber piece b falls (arrow B) into the sorting compartment.

Below the sorting compartments there is a lower take-up conveyor 15 that takes timber lots T to be further processed, for instance to ribbing and packing apparatus. Instead of bottom conveyor 15, timber carriages can also be used.

The frame structure of the sorting compartments comprise vertical beams 31 supported on foundation 30 and connected with each other by horizontal beams 32 to which traverses 33 are fastened.

The bottoms of the compartments comprise twin supporting arms 12a and 12b which are fastened at their outer ends to flexible suspender or supporter steel ropes, straps or similar items 10a,10b. At their top ends, the flexible supporter pairs are guided to winder equipment 17, driven by motors 18 via chains 29. Supporters pairs 10a,10b of each sorting compartment, of which there are, side by side, two or more pairs, for instance three, as in FIG. 2, are connected with driving motor 18 by means of axels 28, said motor 18 being controlled by an automatic system, known as such, to start according to a certain automatic program as the timber compartment is full. This state of fullness can be indicated for instance with photocell equipment, also known as such.

The construction and function of a compartment device in accordance with the invention will now be described. In FIG. 1, the left-side compartment is empty and ready to receive on its closed bottom timber pieces coming from top conveyor 20, said bottom comprising arm pairs 12a''',12b''', interlocked by means of locking device 14. As timber pieces are introduced into the compartment, the bottom is moved downwardly as motor 18 lets supporters 10a, 10b move downwardly in the direction of arrow C.

In FIG. 1, timber lot $T_3$ has accumulated into the compartment second from the left, and supporters 10a 10b, with the completed timber lot, is lowered in the direction of arrow C so as to place timber lot $T_3$ on the bottom conveyor 15. This phase of operation is illustrated with the next compartment, in which timber lot $T_2$ has been placed on the bottom conveyor 15, and as supporters 10a' and 10b' have further been lowered, the rigid supporting arms 12a, 12b turn from their acute-angled (angle $\alpha$) position so that said angle $\alpha$ opens and the interlocking of the ends of arms 12a' and 12b' is released. For this purpose, on foundation 30 there are protruding parts 16 that effect complete opening of the interlocking upon contact by releasing flange 35b at the end of supporting arm 12b' from behind the locking spur of locking arm 14'. After this, the flexible supporters move to positions indicated in FIG. 1 with supporters 10a''' and 10b''' on both sides of timber lot $T_2$, after which supporting arms 12a''' and 12b'''are, controlled by the automatic system, wound up in the direction of arrow D as shown in right-hand compartment of FIG. 1; the timber lot $T_1$, after being discharged from this compartment, is no more supported by compartment sections 12 and 10, and is ready to be removed, in the direction of arrow A, further on to packing and ribbing apparatus, for instance.

Another advantage of the invention is that, immediately after the interlocking between the ends of arms 12a' and 12b' has been released, it is possible to start, by means of lower conveyor 15, moving the timber lot $T_2$ forward, before it is necessary to lift arms 12a' and 12b' upwardly. Arms 12a' and 12b' can, of course, be lifted to the top position past timber lot $T_2$ before starting to move lot $T_2$ by means of the bottom conveyor 15.

Figure 3:
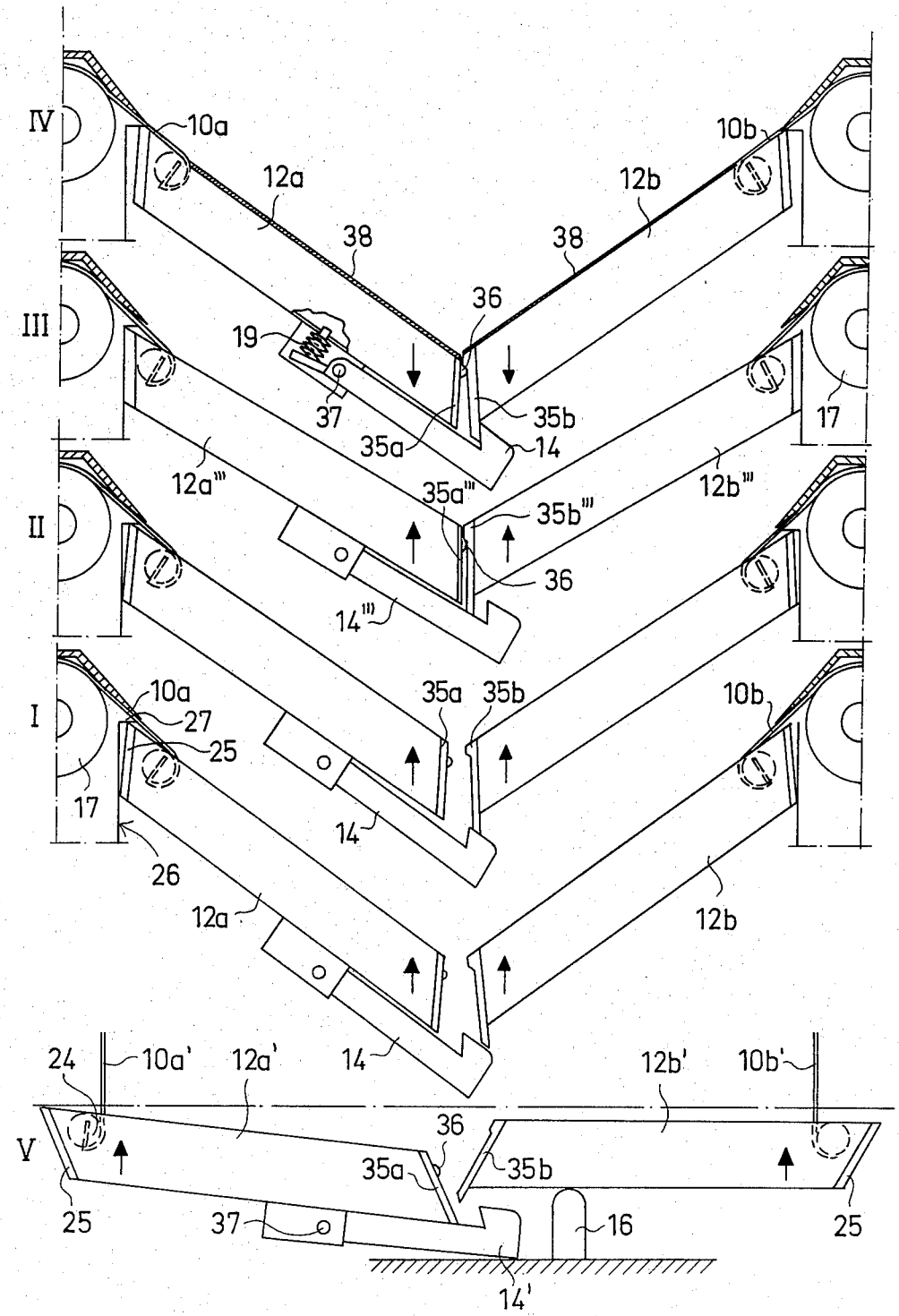
FIG. 3 shows the bottom of a compartment in five different phases of operation and in a larger scale.

As supporting arms 12a'' and 12b'' move from the position of FIG. 1 upwardly, flanges 25 of their top ends become guided by oblique surfaces 23 to the position shown in FIG. 3I, wherein flanges 25 have come underneath the overhead ledge 27 (FIG. 1). As supporters 10a, 10b are tightened even more, the apparatus reaches the position shown in FIG. 3II, in which locking arm 14 is guided behind flange 35b at the end of arm 12b, which has already taken place in FIG. 3III, in which locking arm 14''' has extended behind flange 35b''', and spur 36 of flange 35a''' has become positioned under the protrusion of flange 35b'''. Now the compartment bottom, formed by rigid arms 12a''' and 12b''', is in the top position ready to take up the next timber lot. In FIG. 3IV, supporters 10a and 10b start to loosen and arms 12a and 12b start to move downwardly and the lower part of flange 35b of arm 12b is locked behind the locking spur of locking arm 14, in which position arm 14 is held in position by spring 19, which turns locking arm 14 around its pivot 37 to the locking position. In FIG. 3II, spring 19 lets arm 14 turn so as to permit the locking to take place.

In the illustration of FIG. 3IV, arms 12a and 12b are coated with rubber or some other corresponding material 38 for reducing harmful impact forces when timber pieces fall on arms 12a,12b.

We believe that the construction of our novel sorting compartment and its method of use will be understood that the advantages thereof will be fully appreciated by those persons skilled in the art.

What we claim is:

1. A method for the use of timber sorting compartments, in which method a sorting compartment is filled with timber pieces (a,), after which the sorting compartment is opened and the accumulated timber lot ($T_2$) is allowed to discharge onto take-up equipment (15), by means of which the timber lot is then carried on to be further processed, after which the compartment is closed to be ready to receive the next timber lot; wherein the method comprises the steps of:

accumulating the timber lot ($T_2$) upon rigid supporting arms (12a,12b) suspended and extended by pairs of flexible suspending means (10a,10b), these means being located on both sides of the accumulated timber lot ($T_2$);

lengthening the pairs of flexible suspending means (10a,10b), then opening or allowing the supporting arms (12a,12b) to open;

lifting the supporting arms (12a'',12b'') independently and by separate paths to a top position by shortening the pairs of flexible suspending means (10a,10b);

locking the supporting arms (12a''',12b''') to form a closed bottom of the compartment for receiving pieces of the next timber lot, and repeating the phases for the next timber lot.

2. A method in accordance with claim 1, wherein the timber lot is formed upon supporting arm pairs (12a,12b) suspended by pairs of suspending means (10a,10b), arms of said supporting arm pairs being interlocked, and further including the steps of:

opening or allowing said interlocking of supporting arm pairs (12a',12b') to open, and lifting the respective supporting arms (12a″,12b″) of the pairs of supporting arms, separated from each other, to the top position, shortening the pairs of flexible suspending means, and locking the supporting arms (12a‴,12b‴) or each pair in the top position to form the closed bottom of the compartment for the take-up of the next timber lot.

3. A method in accordance with claim 2, including the step of guiding the arms of the supporting arms pairs, in their top position, to form an acute angle ($\alpha$) with their inner ends towards each other, so that they (12a‴,12b‴) interlock as pairs to form the closed bottom of the compartment.

4. A method in accordance with claims 1, 2 or 3, including the step of raising and lowering the supporting arms (12a,12b) by synchronously winding and unwinding the pairs of flexible suspending means (10a,10b).

5. A sorting compartment of a timber sorting installation, comprising:
  flexible supporter means (10a,10b), connected at the top ends thereof with winding equipment, rigid supporting arms, fastened to lower ends of said supporters, locking means (14,19,35b,36,37) connected to adjacent ends of said supporting arms, a take-up conveyor,
  means (16) positioned beneath the level of the take-up conveyor (15) for unlocking said locking means, and guide means at the top of the compartment (23,27) for guiding said supporting arms so that said supporting arms (12a‴,12b‴) are locked by said locking means in a position in which they form the closed bottom of a compartment when the supporting arms are in their top position.

6. A sorting compartment in accordance with claim 5, wherein the supporting arms comprise supporting arm pairs fastened near their outer ends (24) to flexible supporters (10a,10b),
  flange means (35a,35b) at the inner ends of respective supporting arms,
  a locking arm having a spur carried by one supporting arm of each pair, and
  spring means (19) associated with said locking arm urging said spur into locking engagement with the flange means of the other supporting arm.

7. A device in accordance with claim 6, wherein said flanges (35a,35b) and corresponding flanges (25) at the outer ends of said supporting arms (12a,12b) are in an oblique position in relation with the longitudinal direction of the supporting arms (12a,12b), so that said supporting arms (12a,12b) are locked, pair by pair, to form an acute angle ($\alpha$), seen in profile.

8. A sorting compartment in accordance with claim 7, wherein in the top part of each sorting compartment, at both its sides, there are quiding surfaces (23) and spurs (36), under which spurs the corresponding flanges (25) of the top end of each supporting arms (12a,12b) is quided so as to effect interlocking of the outer ends of the supporting arms (12a,12b).

9. A sorting compartment of a timber sorting installation, comprising:
  flexible supporter means (10a,10b), connected at the top ends thereof with winding equipment, rigid supporting arms (12a,12b), fastened to lower ends of said supporters, locking means (14,19,35b,36,37) connected to adjacent ends of said supporting arms, a take-up conveyor,
  means (16) positioned beneath the level of the take-up conveyor (15) for unlocking said locking means, and guide means at the top of the compartment (23,27) for guiding said supporting arms (12a,12b) so that said supporting arms (12a‴,12b‴) are locked by said locking means in a position in which they form the closed bottom of a compartment when the supporting arms are in their top position; and
  flanges (35a,35b) at the inner ends of respective supporting arms and corresponding flanges (25) associated with the outer ends of said supporting arms (12a,12b) in an oblique position relative to the longitudinal direction of the supporting arms (12a,12b), so that the supporting arms are locked, pair by pair, to form an acute angle (a), seen in profile.

* * * * *